Figure 1:
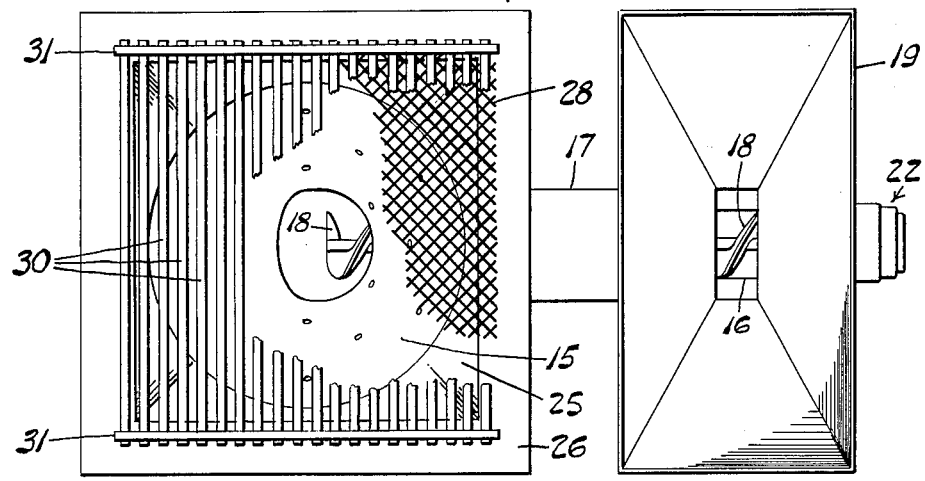

Dec. 14, 1965   P. S. TSAKOS   3,223,077
CHARCOAL GRILL
Filed April 7, 1964

INVENTOR.
PETER S. TSAKOS
BY
Christel & Bean
ATTORNEYS

United States Patent Office 3,223,077
Patented Dec. 14, 1965

3,223,077
CHARCOAL GRILL
Peter S. Tsakos, 171 Tacoma Ave., Buffalo, N.Y.
Filed Apr. 7, 1964, Ser. No. 357,904
6 Claims. (Cl. 126—25)

This invention relates to cooking apparatus and particularly to a charcoal grill or broiler.

In the prior art many forms of charcoal fired grills for broiling foods, usually meats, have been proposed and provided. The usual arrangement is to have a fire pan beneath the grill wherein charcoal is placed at the beginning of a period of use and to which more charcoal may be added from time to time by depositing the same on top of the charcoal already in the pan or box. It is common to supply forced draft air to the fire and this may be done by manual or power means.

The present invention provides a novel broiler grill combination wherein the charcoal fire is more or less continuously fed by an underfeed stoker of a type generally known in the space heating and boiler arts. Automatic stoker arrangements have not, to my knowledge, been previously employed in the charcoal broiler field. I have found that substantial advantages in cooking and fuel efficiency, reliability and effectiveness are attained in a charcoal grill combination wherein a stoker fed charcoal burner of the underfeed type is employed in conjunction with air blower means and a compound grill arrangement comprising a heat spreading and ash deflecting screen member which consists of a horizontal metal mesh member or perforated or expanded sheet metal member spaced above the burner together with a horizontal series of grill bars spaced above the heat spreading member.

In the form of the present invention illustrated herein the deflecting screen member and the overlying grill bars comprise a single rigid unit which rests upon the top of the main body structure of the apparatus and is freely liftable therefrom. Further, a vertical throat member of refractory material is provided which extends upwardly from the burner or fire pot and diverges to define at its upper end a desired cooking area.

While a single specific embodiment of the principles of the present invention is illustrated in the accompanying drawing and described in the following specification, it is to be understood that such embodiment is by way of example only and that various mechanical modifications may be made without departing from the spirit of the invention, the scope of which is limited only as defined in the appended claims.

Figure 2:
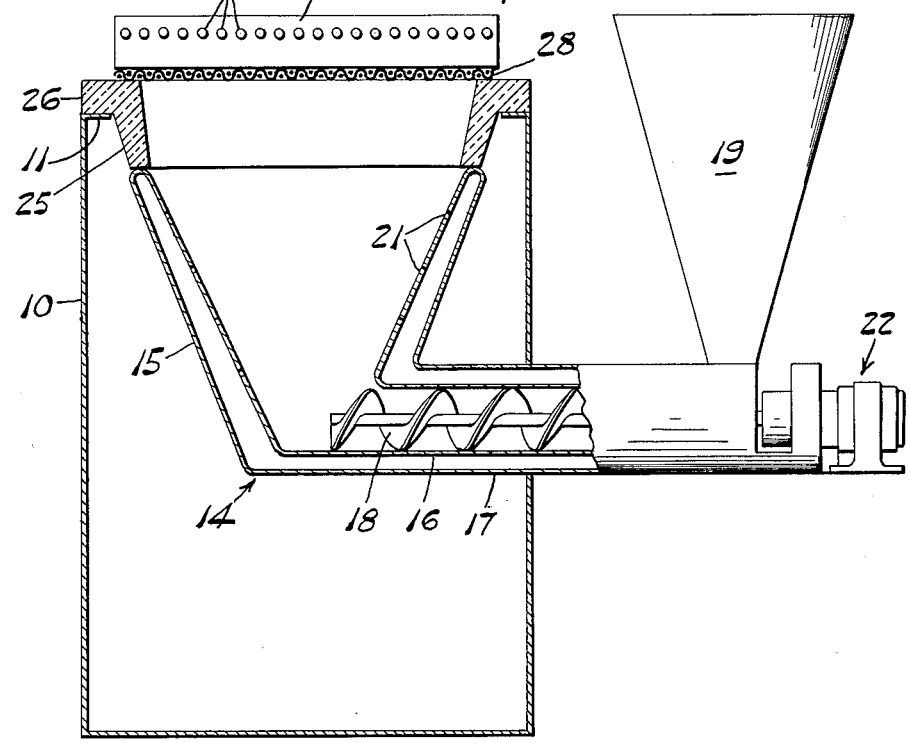

In the drawing:

FIG. 1 is a top plan view of one form of the charcoal grill apparatus of the present invention with portions broken away for added illustration; and FIG. 2 is a side elevational view of the apparatus of FIG. 1 with the major portion shown in vertical cross-section through a central plane of the apparatus.

In the drawing like characters of reference denote like parts and, referring particularly to FIG. 2, the numeral 10 designates a general casing or housing which is box-like in form and has an inwardly extending flange 11 about its upper edge.

A charcoal-burning stoker unit is designated generally by the numeral 14 in FIG. 2 and comprises a double-walled fire pot 15 and telescoping conduits 16 and 17 leading to the base of the fire pot. The inner conduit 16 houses a screw conveyor 18 which feeds charcoal from a hopper 19 to the lower portion of the interior of fire pot 15.

The annular space between conduits 16 and 17 leads to the space between the inner and outer walls of fire pot 15 and conduits draft air to such space for discharge through perforations 21 through the inner wall of the fire pot. The upper surface of the fire in fire pot 15 is generally at or near the plane of the upper end of fire pot 15.

The mechanical details of the stoker drive arrangement are not novel to the present invention. A combined motor and gear reduction unit for driving screw conveyor 18 is designated generally by the numeral 22 and includes a blower for discharging draft air through the annular space between conduits 16 and 17, such motor, reducer and blower units being known in the stoker art.

An annular refractory member 25 forms an outwardly flaring upward continuation of fire pot 15. The lower end of annular member 25 is circular and is in registry with the upper end of the fire pot. The upper end of annular member 15 is preferably square or rectangular and includes a marginal portion 26 which seats upon the flanges 11 of housing 10.

The annular wall of member 25 forms an upwardly flaring opening or throat which likewise is circular at its lower end and diverges to form a square or rectangular opening at its upper end, thus defining a square or rectangular cooking area.

The grill portion of the apparatus which overlies the aforesaid square or rectangular cooking area comprises, basically, a screen or mesh member and a grill surface spaced substantially above the same. The screen member may be in various forms such as perforated or expanded metal but is shown herein as comprising a woven wire mesh member 28 of sufficient size to cover the square upper end opening in the annular member 25 and rest upon the upper marginal portion 26 of the annular member.

In the present instance the grill surface comprises a series of horizontally extending parallel metal bars 30 supported at their ends in a pair of side rails 31 which may be welded or otherwise secured at their lower edges to the upper surface of screen member 28. The rigid composite structure comprising screen member 28 and grill bars 31 rests on portion 26 of annular member 25 and may be freely lifted therefrom.

I claim:

1. In a charcoal grill, a fire pot having an open upper end, underfeed charcoal stocking mechanism for said fire pot, means for supplying draft air through wall portions of said fire pot, an annular member of refractory material having its lower end against and in registry with the upper end of said fire pot, said annular member flaring upwardly to define a cooking area at its upper end, a screen extending across the upper end of said annular member to distribute heat laterally and arrest fly ash from said fire pot, and a grill surface comprising a series of spaced parallel horizontal bars spaced substantially above said screen, said fire pot and said annular member extending continuously upwardly to said grill surface and being imperforate excepting for said draft air supply means whereby the products of combustion pass substantially entirely upwardly through said grill surface.

2. In a charcoal grill, a fire pot having an open upper end, underfeed charcoal stoking mechanism for said fire pot, means for supplying draft air to said fire pot, an annular member of refractory material having its lower end against and in registry with the upper end of said fire pot, said annular member flaring upwardly to define a cooking area at its upper end, a screen extending across the upper end of said annular member to distribute heat laterally and arrest fly ash from said fire pot, and a grill surface comprising a plurality of spaced horizontal bar portions of relatively high heat retentive capacity spaced substantially above said screen, said fire pot and said annular member extending continuously upwardly to said grill surface and being imperforate excepting for said draft air supply means whereby the products of combustion pass substantially entirely upwardly through said grill surface.

3. In a charcoal grill, a fire pot having an open upper end, underfeed charcoal stoking mechanism for said fire pot, means for supplying draft air through wall portions of said fire pot, an annular member of refractory material having its lower end against and in registry with the upper end of said fire pot, said annular member flaring upwardly to define a cooking area at its upper end, a screen extending across the upper end of said annular member to distribute heat laterally and arrest fly ash from said fire pot, and a grill surface comprising a series of spaced parallel horizontal bars spaced substantially above said screen, said screen and said grill surface bars comprising a rigid integral grill unit resting upon and liftable from the upper end of said annular member, said fire pot and said annular member extending continuously upwardly to said grill surface and being imperforate excepting for said draft air supply means whereby the products of combustion pass substantially entirely upwardly through said grill surface.

4. In a charcoal grill, a fire pot having an open upper end, underfeed charcoal stoking mechanism for said fire pot, means for supplying draft air to said fire pot, an annular member of refractory material having its lower end against and in registry with the upper end of said fire pot, said annular member flaring upwardly to define a cooking area at its upper end, a screen extending across the upper end of said annular member to distribute heat laterally and arrest fly ash from said fire pot, and a grill surface comprising a plurality of spaced horizontal bar portions of relatively high heat retentive capacity spaced substantially above said screen, said screen and said grill surface bar portions comprising a rigid integral grill unit resting upon and liftable from the upper end of said annular member, said fire pot and said annular member extending continuously upwardly to said grill surface and being imperforate excepting for said draft air supply means whereby the products of combustion pass substantially entirely upwardly through said grill surface.

5. In a charcoal grill, a housing, a fire pot within said housing and having an open upper end disposed substantially beneath the upper end of said housing, underfeed charcoal stoking mechanism for said fire pot, means for supplying draft air through wall portions of said fire pot, a screen extending across the upper end of said housing to distribute heat from said fire pot laterally and arrest fly ash, and a grill surface comprising a series of spaced parallel horizontal bars spaced substantially above said screen, said fire pot and said housing forming a continuous upward duct from said stoking mechanism to said screen excepting for said draft air supply means whereby the products of combustion pass substantially entirely upward to said screen.

6. In a charcoal grill, a housing, a fire pot within said housing and having an open upper end disposed substantially beneath the upper end of said housing, underfeed charcoal stoking mechanism for said fire pot, means for supplying draft air through wall portions of said fire pot, a screen extending across the upper end of said housing to distribute heat from said fire pot laterally and arrest fly ash, and a grill surface comprising a series of spaced parallel horizontal bars spaced substantially above said screen, said screen and said grill surface bars comprising a rigid integral grill unit resting upon and liftable from the upper end of said housing, said fire pot and said housing forming a continuous upward duct from said stoking mechanism to said screen excepting for said draft air supply means whereby the products of combustion pass substantially entirely upward to said screen.

References Cited by the Examiner
UNITED STATES PATENTS

| | | | |
|---|---|---|---|
| 2,141,831 | 12/1938 | Stockstrom et al. | 126—10 X |
| 2,746,378 | 5/1956 | Lang | 126—25 X |
| 2,933,080 | 4/1960 | Adey | 126—25 |

FOREIGN PATENTS

| | | |
|---|---|---|
| 476,238 | 5/1915 | France. |

FREDERICK L. MATTESON, Jr., *Primary Examiner.*

E. G. FAVORS, *Examiner.*